2,873,290

ALKOXIDE SYNTHESIS

Donald L. Esmay, Munster, and Carl E. Johnson, Griffith, Ind., assignors to Standard Oil Company, Chicago, Ill., a corporation of Indiana No Drawing. Application January 18, 1955
Serial No. 482,656

11 Claims. (Cl. 260—448)

This invention relates to a process for the oxidation of alkali metal aluminoalkyls and alkali metal boroalkyls to produce alkoxides which can be hydrolyzed to alcohols.

Alkali metal boroalkyls and aluminoalkyls can be prepared by the reaction of terminal vinyl olefinic hydrocarbons with alkali metal borohydrides and aluminohydrides, respectively. The hydrides which are used to prepare the alkyls have the general formula $MAlH_4$ and $MBH_4$ wherein M represents an alkali metal, viz, lithium, sodium, potassium, rubidium or cesium, preferably lithium, sodium or potassium. The terminal vinyl olefins which react with said complex hydrides have the formula

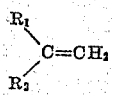

wherein $R_1$ and $R_2$ are the same or different substituents, and are selected from the class consisting of hydrogen and hydrocarbon radicals. We prefer to use unbranched terminal vinyl olefins. The alkali metal boroalkyls or aluminoalkyls which are oxidized in accordance with this invention have the general formulae

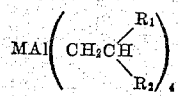

or

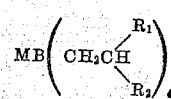

The preparation of alkali metal aluminoalkyls is described, for example, in a publication by K. Ziegler et al., Annalen 473, 1–35 (1929). The alkyl compounds used as charging stocks in the present invention are prepared by the reaction of terminal vinyl olefins with alkali metal aluminohydrides or alkali metal borohydrides at temperatures between about 75° C. and about 170° C., for example between about 120° and 150° C., under atmospheric or elevated pressure which may be as high as 1000 to 5000 p. s. i. g. The presence of hydrogen in the alkylation zone will increase the yield somewhat by preventing decomposition of metal hydride to metal before reaction of the hydride with olefin occurs. The conversion of the alkali metal aluminohydride or borohydride to the corresponding alkyl compounds may be effected in the presence of an inert reaction diluent such as liquid paraffinic hydrocarbons, low boiling aromatic hydrocarbons such as benzene, or other inert solvents such as tetrahydrofuran or the like.

Depending upon the olefin and the reaction conditions which are employed, the alkyl group which is introduced into the alkali metal aluminohydride or borohydride contains the same number of carbon atoms as the olefin which enters into recation or, in some instances, may contain an integral multiple of the number of carbon atoms in the olefin, i. e., the alkyl group is a "polymer" of the olefinic hydrocarbon reactant. These facts are well known in the prior art and require no elaboration here.

In accordance with the present invention, the alkali metal aluminoalkyl or boroalkyl is oxidized, resulting in the substantial production of the corresponding alkoxide compounds. The oxidation of the alkyl compounds is conveniently effected by contacting with air or other oxidizing gas, preferably in the presence of an inert hydrocarbon diluent, which helps to dissipate the heat of the oxidation reaction. In lieu of air, one may employ flue gas containing small proportions of oxygen, oxygen-enriched air, $NO_2$, ozonized air, etc. The oxidation reaction may be effected under superatmospheric pressure, but the heat of reaction must be dissipated to prevent uncontrollable oxidation. The contacting of the alkali metal aluminoalkyl or boroalkyl with oxidizing gas may be effected in equipment provided with heat exchange facilities to aid in removing the heat of the oxidation reaction, employing conventional gas-liquid contacting means. The products of the oxidation reaction appear to have the general formulae

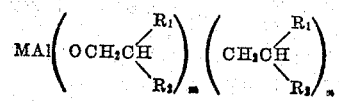

and

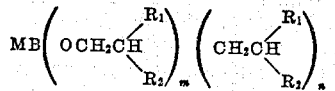

wherein $m$ is an integer having the value of 1 to 4, inclusive, $n$ has a value of 3 to zero and the sum of $m$ and $n$ is 4.

The proportion of oxygen which is employed with respect to the alkali metal aluminoalkyl or boroalkyl may range from the amount theoretically required to produce the desired alkoxide to a value about four times as great. The oxidation may be effected in the presence of solid contact substances such as heavy metals, alumina, silica-alumina, clays, kieselguhr and the like.

We have found that hydrolysis of the alkali metal aluminum alkoxides or boron alkoxides proceeds smoothly and readily to produce alcohols, the predominating alcohol products having the formula

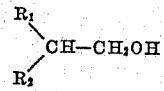

Thus the present invention provides a process for the conversion of an olefin having the structure

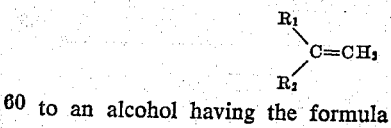

to an alcohol having the formula

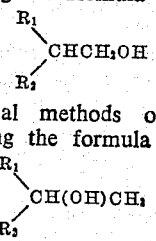

whereas conventional methods of hydrating olefins yield alcohols having the formula

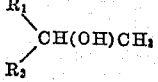

The invention will be described in somewhat greater detail hereinafter and will be illustrated by specific examples which are not, however, intended to function as undue limitations of the scope of the invention.

The terminal vinyl olefins which are converted to alkali metal aluminoalkyls or boroalkyls have the general formula

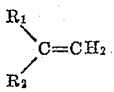

wherein $R_1$ and $R_2$ are the same or different substituents and are selected from the class consisting of hydrogen or a monovalent hydrocarbon radical such as an alkyl radical, a cycloalkyl radical, an aryl radical or a cycloalkenyl radical. Examples of $R_1$ and/or $R_2$ alkyl radicals are methyl, ethyl, n-propyl, isopropyl, butyl, isobutyl, t-butyl, hexyl, heptyl, octyl, decyl or the like. Examples of $R_1$ and/or $R_2$ cycloalkyl radicals include cyclopentyl, methylcyclopentyl, cyclohexyl, methylcyclohexyl, dimethylcyclohexyl and the like. Examples of suitable $R_1$ and/or $R_2$ aryl radicals include phenyl, tolyl, xylyl, naphthyl, xenyl and the like. Examples of suitable $R_1$ and/or $R_2$ cycloalkenyl radicals include cyclohexenyl and similar radicals.

The oxidation of the alkali metal aluminoalkyls and boroalkyls may be effected at temperatures between about $-30°$ C. and about 300° C., usually about $-10°$ C. to $+150°$ C. The preferred oxidation temperature range is between about 0° C. and about 50° C. Pressures during oxidation may range from about 0.01 to about 500 p. s. i. g., usually between about 0.1 and about 50 p. s. i. g., depending in specific detail upon the diluent, the specific charging stock, the specific oxidant and the desired rate of oxidation. Heat generated in the course of the oxidation reaction may be conveniently removed from the reaction zone by an inert diluent, for example a paraffin hydrocarbon such as n-pentane, n-octane or other inert hydrocarbons which reflux at a convenient temperature for the reaction, thus removing heat from the reaction zone primarily as the latent heat of vaporization of the diluent, which may then be condensed outside the reaction zone and returned thereto.

Our invention is illustrated by the following examples.

Example 1

Lithium aluminum hydride in the amount of 0.058 mol was stirred in a glass flask at 120° C. with 1.8 mols of 1-decene in a nitrogen atmosphere. The grey-blue solid hydride disappeared in about 11 hours, and a new, lighter colored, finely divided powder appeared. The mixture was cooled to 30–40° C. and dry air was bubbled through until heat was no longer evolved. At this time 5 g. of water was added slowly with stirring. The solids were filtered off and the filtrate was fractionally distilled to recover 17 g. of decanol, which is a yield of about 50% of theoretical. The product was chiefly 1-decanol, as the following comparison shows:

| | Product | Authentic 1-Decanol |
|---|---|---|
| B. P., °C | 220°–235° | 231°. |
| Sp. Gr | 0.824 (23/4° C.) | 0.8297 (20/4° C.). |
| Ref. index, 20/D | 1.437 | 1.437. |
| F. P., °C | +4° | +7°. |

Our preparation gave a vigorous evolution of hydrogen gas when contacted with sodium metal, thus confirming the presence of the OH group due to alcohol. Apparently the following reactions occurred:

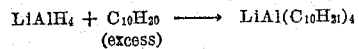

$$LiAl(C_{10}H_{21})_4 + 2O_2 \rightarrow LiAl(OC_{10}H_{21})_4$$

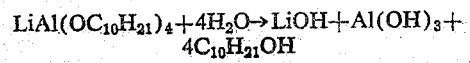

Example 2

Lithium borohydride (2.8 g.) was stirred with 400 ml. of 1-decene in a nitrogen atmosphere. The mixture was heated to 45° C. It was then heated to 140° C. for 5 hours. Next, it was oxidized with an air current at 140° C. for 3 hours, and hydrolyzed by 15 g. of water at 50° C. The product mixture was filtered and the unreacted decene removed by distillation, using a 5-inch Vigreux column, to a temperature of 175° C. (head) and 230° C. (bottom). The residue of 20 g. corresponds to a yield of 26 weight percent of decanol. This residue reacted vigorously with Na yielding hydrogen. The following properties of the product also identify it as being principally 1-decanol:

| | |
|---|---|
| Sp. gr | 0.84 (23/4° C.). |
| Ref. index, D/20 | 1.443. |
| B. P., °C | 230° upward. |

Example 3

The process of Example 2 is repeated but the same number of equivalents of sodium borohydride is substituted for the lithium borohydride. The oxidation is conducted as in Example 2 and hydrolysis and product work-up are carried out as described therein.

Example 4

The process of Example 1 is repeated but an equimolar quantity of sodium aluminum hydride is substituted for the lithium aluminum hydride of Example 1.

Example 5

Lithium aluminum hydride (0.11 mol) was contacted with 0.84 mol of propylene in 100 ml. of n-hexane. A closed, stirred, metal reactor was used. The reactor was heated to 135° C. over a period of about 2 hours. At 135° C. a vigorous reaction set in which caused a sharp rise of 5° in temperature and a sharp drop in pressure from 465 to 375 p. s. i. g. After stirring for two hours more at 135° C., the reactor was cooled. Unreacted propylene was recovered in the amount of 0.45 mol. Pure oxygen was admitted slowly to the reactor over a two-hour period until no more was absorbed. Several thousand cc. of oxygen were required, and the temperature rose to 42° C. The alkoxide-hexane mixture was removed from the reactor and was hydrolyzed by means of 0.5 mol of water. The solid metallic hydroxides were filtered off on a suction filter and washed with hexane. The combined hexane solutions were extracted with successive ten ml. portions of water until no more alcohol was removed. This required 9 portions. The 108 ml. of aqueous solution was carefully fractionated to obtain 21.3 ml. of the n-propyl alcohol-water azeotrope boiling at 87–88° C., having the refractive index ($n_D^{20}$) of 1.3782, specific gravity of (20/4° C.) 0.858 and containing 71% of n-propyl alcohol. This is a yield of 12.9 grams or 0.26 mol of the alcohol, which is 59% of the theoretical yield based on the charge of metal hydride.

Example 6

Lithium aluminum hydride (4.0 g.) was stirred with 45 g. of styrene and 45 g. of benzene in a pressure reactor under the hydrogen pressure of 90 p. s. i. g. The temperature was raised to 120° C. and held there for 11 hours. The hydrogen was removed and the reactor was cooled to room temperature. Then pure oxygen was admitted slowly to the stirred and cooled reactor until no more oxygen was absorbed. The maximum temperature during oxidation was 42° C. The contents of the reactor were slowly added to 200 ml. of acetone containing 15 g. of water. The solids were filtered out on paper on a suction filter. The filtrate was distilled to remove solvents and to recover methyl phenyl carbinol in the yield of 25% of theoretical, based on $LiAlH_4$; 18% of ethylbenzene was also produced and the balance of the product was styrene polymer. No β-phenethanol was obtained. The methyl phenyl carbinol boiled at 203–212° C. at 750 mm. and had a refractive index of 1.5278 ($n_D^{20}$) and a specific gravity of 1.000. During the distillation a small amount of the alcohol decomposed with the liberation of some water.

It will be appreciated that the rate of hydrolysis of the alkali metal aluminoalkoxides or boroalkoxides may be increased by the use of aqueous acids or alkalies rather than pure water and by the addition of hydrolysis catalysts such as small proportions of cobaltous chloride. Also, the alkoxides of this invention may be subjected to an alcoholysis or trans-esterification reaction in lieu of the hydrolysis process which was described above.

The substitution of sulfur, selenium or tellurium for oxygen, in reaction with the boroalkyls or aluminoalkyls results in the production of the corresponding sulfur, selenium and tellurium compounds, respectively.

Having thus described our invention, what we claim is:

1. A process for the preparation of an alkoxide of a compound selected from the class consisting of alkali metal boroalkyls and alkali metal aluminoalkyls, wherein each alkyl group contains at least 2 carbon atoms, which process comprises contacting a compound of said class in the presence of an inert liquid hydrocarbon diluent with molecular oxygen under conditions to produce a substantial yield of said alkoxide.

2. A process for the preparation of an alkoxide of a compound selected from the class consisting of alkali metal boroalkyls and alkali metal aluminoalkyls, wherein each alkyl group contains at least 2 carbon atoms, which process comprises contacting a compound of said class in the presence of an inert liquid hydrocarbon diluent with molecular oxygen at a temperature between about −30° C. and about 300° C. in proportions sufficient to effect substantial production of said alkoxide.

3. A process for the preparation of a lithium aluminum alkoxide, which process comprises contacting a lithium aluminoalkyl having the formula

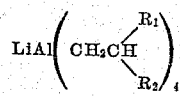

wherein $R_1$ and $R_2$ are selected from the class consisting of hydrogen and hydrocarbon radicals, with molecular oxygen at a temperature between about −10° C. and about 150° C. in the presence of an inert liquid hydrocarbon diluent to produce a substantial yield of a lithium aluminum alkoxide.

4. A process for the preparation of a lithium boroalkoxide, which process comprises contacting a lithium boroalkyl having the formula

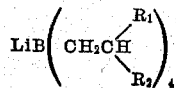

wherein $R_1$ and $R_2$ are selected from the class consisting of hydrogen and hydrocarbon radicals, with oxygen in the presence of an inert liquid hydrocarbon diluent at a temperature between about −10° C. and about 150° C. to produce a substantial yield of a lithium boroalkoxide.

5. A process for the preparation of a lithium aluminum propoxide, which process comprises contacting lithium aluminum tetrapropyl having the formula $$LiAl(CH_2CH_2CH_3)_4$$

with oxygen in the presence of an inert liquid hydrocarbon diluent at a temperature between about 0° C. and about 50° C.

6. A process for the preparation of lithium aluminum decoxide, which process comprises contacting a lithium aluminum tetradecyl having the formula $LiAl(C_{10}H_{21})_4$ with molecular oxygen at a temperature between about 0° C. and about 50° C. in the presence of an inert liquid hydrocarbon diluent.

7. A process for the preparation of lithium aluminum phenethyl oxide, which process comprises contacting a lithium aluminum phenethyl with oxygen in the presence of an inert liquid hydrocarbon diluent at a temperature between about 0° C. and about 50° C.

8. A process for the preparation of a primary alcohol which comprises effecting reaction between a terminal vinyl alkene and an alkali metal aluminum hydride at a temperature between about 75° C. and 170° C. to produce an alkali metal aluminoalkyl, thereafter contacting said alkali metal aluminoalkyl in the presence of an inert liquid hydrocarbon diluent with molecular oxygen at a temperature between about −10° C. and about 150° C. to produce a substantial yield of an alkali metal aluminum alkoxide and hydrolyzing said alkoxide to produce a primary alcohol.

9. The process of claim 8 wherein said terminal vinyl alkene is 1-decene, said alkali metal aluminum hydride is lithium aluminum hydride and said alcohol is 1-decanol.

10. The process of claim 8 wherein said terminal vinyl alkene is propylene, said alkali metal aluminum hydride is lithium aluminum hydride and said alcohol is n-propanol.

11. The process of claim 8 wherein said contacting with oxygen is effected at a temperature between about 0° C. and about 50° C.

References Cited in the file of this patent

Dermer, Chem. Reviews, vol. 14, pp. 394, 395 (1934).
Bamford et al.: J. Chem. Soc. (London), 1946, pp. 695–701.
Sidgwick: Chemical Elements and Their Compounds, vol. 1, pp. 370-371, Oxford Univ. Press., London, 1950.
Hurd: Chemistry of the Hydrides, John Wiley & Sons, Inc., 1952, p. 73.